Oct. 31, 1950 M. B. TAYLOR 2,527,598
AUTOMATIC PILOT FOR SMALL AND PILOTLESS AIRCRAFT
Filed Aug. 11, 1947
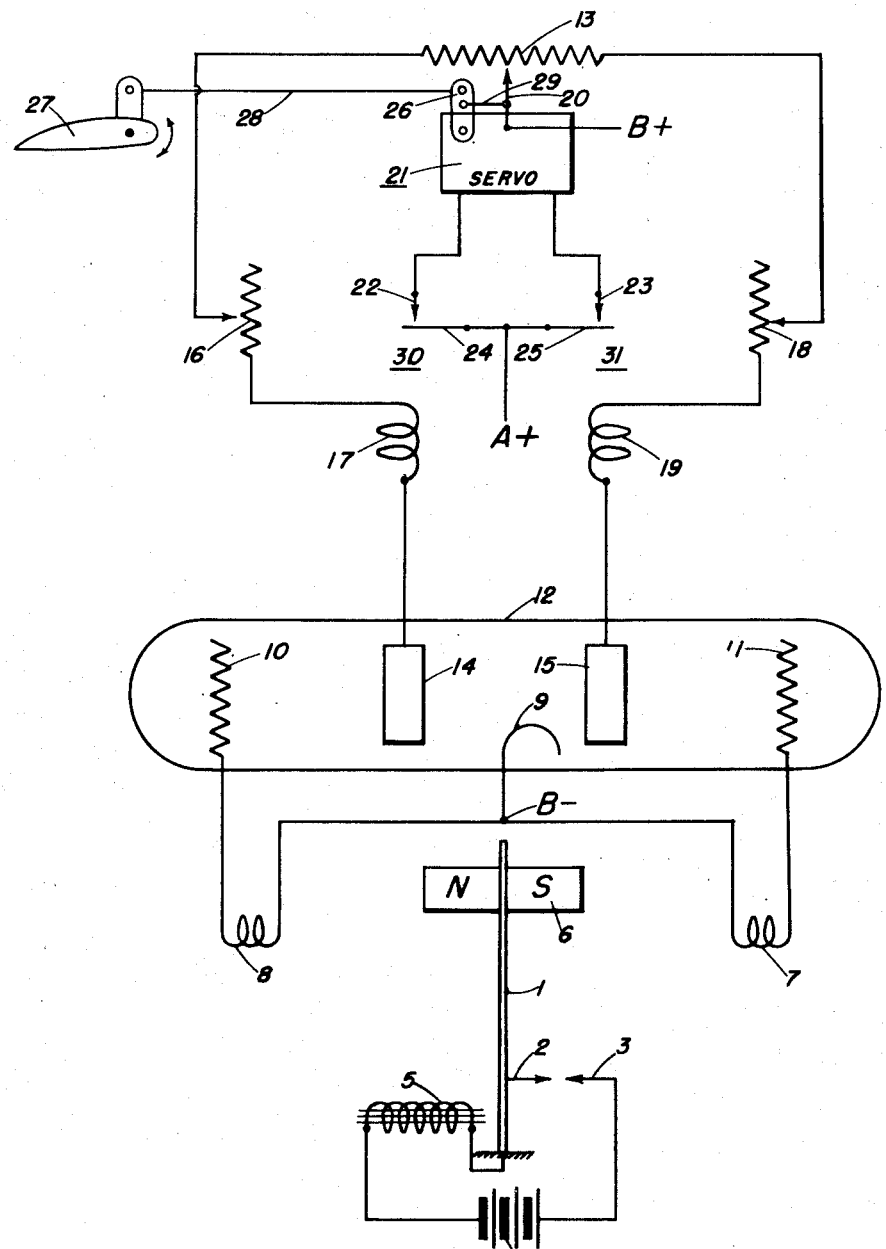
Inventor
MOULTON B. TAYLOR
By
F. Schmitt
Attorney Patented Oct. 31, 1950

2,527,598

UNITED STATES PATENT OFFICE 2,527,598

AUTOMATIC PILOT FOR SMALL AND PILOTLESS AIRCRAFT

Moulton B. Taylor, Longview, Wash.

Application August 11, 1947, Serial No. 767,898

3 Claims. (Cl. 318—489)

(Granted under the act of March 3, 1883, as amended April 30, 1928; 370 O. G. 757)

My invention relates to automatic pilots, and particularly to automatic pilots of the oscillating mass type.

My system for the automatic stabilization of aircraft is based upon the principle of gyroscopic precession which applies to an oscillating mass as well as to a rotating mass. This property is demonstrated in the case of heavy vibrating reeds, such as tuning forks.

This vibrating reed system provides stabilization on the basis of rate of motion. Thus it would not provide any stable reference. The airframe being stabilized by such a system would therefore require referenced intelligence to permit straight and level flight. This system permits simple tie-in to target-seeking devices which would provide the needed intelligence merely by proportional control of rheostats. In the case of small pilotless aircraft such as commercial light planes, the required intelligence may be provided by a barometric altimeter for control of pitch, and a suitable compass with pick-off for control in azimuth.

My system adapts itself readily to high speed motion and rapid accelerations such as may be encountered in guided missiles and its extreme simplicity permits a low cost system for expandable purposes.

The principal object of my invention is to provide means for the automatic stabilization of aircraft.

An important object of my invention is to provide automatic stabilization means which is simple in construction and extremely small in size as compared with other known types of stabilizing equipment.

A further object of my invention is to provide automatic stabilizing means employing gyroscopic precession of an oscillating mass.

A still further object of my invention is to provide stabilization on the basis of rate of motion.

Another object of my invention is to provide stabilizing means wherein rotating masses are eliminated and attendant bearing difficulties avoided.

The figure of the drawing shows a wiring diagram of my invention.

In the drawing, wherein for the purpose of illustration, is shown a preferred embodiment of my invention, the numeral 1 designates a magnetically responsive vibratile reed, cantilever mounted, carrying an interrupting contact 2 coacting with a fixed contact 3. In series between said contact 3 and the fixed end of reed 1, is connected a battery 4 and an iron cored coil 5. Said coil 5 is positioned in operative relation to reed 1, so that the reed 1 can be magnetically attracted by the electro-magnet 5. To the free end of reed 1 is mounted a permanent bar magnet 6 arranged to induce alternating currents in coils 7 and 8. Coils 7 and 8 are connected across the common cathode 9 and grids 10 and 11, respectively of vacuum tube 12.

A potentiometer resistance element 13 is connected to plates 14 and 15 through rheostat 16 and relay coil 17, and through rheostat 18 and relay coil 19, respectively. Across potentiometer sliding contact 20 and cathode 9 is connected a B battery supply.

A reversible servo-motor 21 is electrically connected to fixed relay contacts 22 and 23 which are associated with relay armatures 24 and 25, respectively. The relay armatures 24 and 25 are connected to a source of current A+. Servomotor 21 actuates arm 26 to the left or right depending upon the direction of rotation of the servo. Control surface 27 and slider 20 are in turn connected to arm 26 through linkage bars 28 and 29, respectively.

In operation, movement of the entire assembly carrying the vibrating reed, in a direction 90° to the plane of oscillation will result in precession of the end portion of the reed carrying the magnet 6 which in turn results in a difference in voltage being developed across the coils 7 and 8 proportional to the rate of motion of the entire assembly. These voltages are of the alternating current type and are amplified by vacuum tube 12, resulting in a difference in the applied voltage to the two sensitive relays 30 and 31. Said relay armatures 24 or 25 will be actuated to close with contacts 22 or 23, respectively, thereby operating the servo 21 in a direction depending upon whether coil 7 or 8 is developing the greater voltage.

This servo motion actuates potentiometer slider 20 which electrically balances the coils 17 and 19. This opens the sensitive relay armatures 24 or 25 whichever was actuated. The motion of the servo is communicated to the control surface 27 through linkage means 28. The surface 27 is therefore deflected to a degree proportional to the rate of maneuver which has occurred. It is obvious that one complete axis stabilization may be inclined in relation to the airplane's flight axis to provide stabilization for both roll and yaw. This motion would be transmitted through the servo to either ailerons or rudder depending upon the airplane configuration.

The entire system would be balanced by means of rheostats 16 and 18 for zero setting. Another similar complete circuit would be employed for control of the elevators. The airplane may be maneuvered by means of suitable remote control of the rheostats 16 and 18. The entire instrument providing 3 axis stabilization could be basically contained in a single small standard aircraft instrument case.

The invention described herein may be manufactured and used by or for the Government of the United States of America for governmental purposes without the payment of any royalties thereon or therefor.

What is claimed is:

1. In an automatic pilot for an aircraft having a servo mechanism for actuating the control surfaces of the aircraft, a pair of relay means for controlling the operation of said mechanism, means connected to each of said relay means and responsive to the deviation of the aircraft from a predetermined course for controlling the current through said relay means, and follow-up means operable by said mechanism for deactuating said relays, apparatus for providing automatic stabilization of the aircraft on the basis of rate of motion, said apparatus comprising: precessionable vibratile means; means for oscillating said vibratile means; magnetic field means carried on one end of said vibratile means; conducting means positioned on opposite sides of and in alignment with said magnetic field means, said conducting means being magnetically coupled to said field means; a pair of vacuum tubes having their output circuits connected in series with the coils of said relay means respectively; and means for applying the voltages developed across said conducting means to the input circuits of said tubes, respectively.

2. In an automatic pilot for an aircraft having means for actuating the control surfaces of the aircraft, a pair of relay means for controlling the operation of said actuating means, and means responsive to the deviation of the aircraft from a predetermined course for controlling the current through each of said relay means, apparatus for automatically stabilizing the aircraft on the basis of rate of motion thereof, said apparatus comprising: precessionable vibratile means having magnetic field means at one end thereof; conducting means positioned on opposite sides of and in alignment with said field means, said conducting means being magnetically coupled to said field means; a pair of vacuum tubes having their output circuits connected in series with the coils of said relay means, respectively; and means for applying the voltages developed across said conducting means to the input circuits of said tubes, respectively.

3. In an automatic pilot for an aircraft having means for actuating a control surface of the aircraft, a pair of current responsive devices for controlling the operation of said actuating means, and means responsive to the deviation of the craft from a predetermined course for controlling the current through each of said devices, an apparatus for stabilizing the craft on the basis of rate of motion thereof, said apparatus comprising: precessionable vibratile means having magnetic field producing means at one end thereof; conducting means positioned on opposite sides of and in alignment with said producing means, said conducting means being magnetically coupled to said producing means; and variable impedances connected in series with said devices, respectively, said impedances being responsive to the magnitudes of the voltages induced in said conducting means, respectively.

MOULTON B. TAYLOR.

REFERENCES CITED

The following references are of record in the file of this patent:

UNITED STATES PATENTS

| Number | Name | Date |
|---|---|---|
| Re. 22,409 | Lyman et al. | Dec. 21, 1932 |
| 1,873,579 | Haas | Aug. 23, 1932 |
| 2,059,271 | Parker | Nov. 3, 1936 |
| 2,217,254 | Langgasser | Oct. 8, 1940 |
| 2,347,200 | Lehde | Apr. 25, 1944 |